(12) United States Patent
Shimizu et al.

(10) Patent No.: US 6,660,867 B2
(45) Date of Patent: Dec. 9, 2003

(54) METAL COMPLEX TYPE SQUARYLIUM COMPOUNDS AND OPTICAL RECORDING MEDIA MADE BY USING THE SAME

(75) Inventors: Ikuo Shimizu, Yokkaichi (JP); Hiroshi Toyoda, Yokkaichi (JP); Motoharu Kinugasa, Yokkaichi (JP); Shiho Yamada, Yokkaichi (JP); Soh Noguchi, Yokohama (JP); Tsutomu Satoh, Yokohama (JP); Tatsuya Tomura, Tokyo (JP)

(73) Assignees: Kyowa Hakko Kogyo Co., Ltd., Tokyo (JP); Kyowa Yuka Co., Ltd., Tokyo (JP); Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/203,409

(22) PCT Filed: Dec. 19, 2001

(86) PCT No.: PCT/JP01/11116

§ 371 (c)(1),
(2), (4) Date: Nov. 27, 2002

(87) PCT Pub. No.: WO02/50190

PCT Pub. Date: Jun. 27, 2002

(65) Prior Publication Data

US 2003/0187272 A1 Oct. 2, 2003

(30) Foreign Application Priority Data

Dec. 20, 2000 (JP) ........................................ 2000-387192

(51) Int. Cl.[7] ................ B32B 3/02; C07F 5/06
(52) U.S. Cl. ............... 548/105; 369/275.2; 428/64.1; 428/64.8; 428/64.9; 430/213; 430/270.14
(58) Field of Search ................. 548/105; 428/64.8, 428/64.9

(56) References Cited

FOREIGN PATENT DOCUMENTS

| EP | 1152001 | * 11/2001 |
|---|---|---|
| JP | 2000-159776 | * 1/2000 |
| JP | 2001-345059 | * 12/2000 |
| JP | 2001-023235 | * 1/2001 |

OTHER PUBLICATIONS

Jurgen Gauger, et al, *Chem. Ber.*, vol. 103, 3553–3562 (1970).*

* cited by examiner

*Primary Examiner*—Robert W. Ramsuer
(74) *Attorney, Agent, or Firm*—Finnegan, Henderson, Farabow, Garrett & Dunner, L.L.P.

(57) ABSTRACT

An object of the present invention is to provide a material having spectroscopic properties, light resistance, solubility and thermal decomposition properties suitable for recording for DVD-R. More specifically, the present invention provides squarylium compounds in a state of a metal complex represented by the general formula (I):

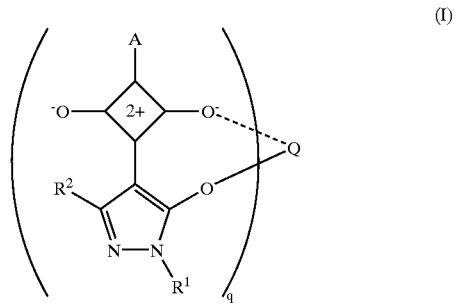

wherein, $R^1$ and $R^2$ are the same or different, and represent an alkyl group optionally having a substituent, an aralkyl group optionally;,having a substituent, an aryl group optionally having a substituent, or a heterocyclic group optionally having a substituent; Q represents a metal atom with a coordination ability; q represents 2 or 3; and A represents an aryl group optionally having a substituent, a heterocyclic group optionally having a substituent, or Y=CH— wherein Y represents an aryl group optionally having a substituent or a heterocyclic group optionally having a substituent.

12 Claims, No Drawings

METAL COMPLEX TYPE SQUARYLIUM COMPOUNDS AND OPTICAL RECORDING MEDIA MADE BY USING THE SAME

TECHNICAL FIELD

The present invention relates to squarylium compounds which can be used in the optical recording field, and to optical recording media using the same.

BACKGROUND ART

In recent years, development of a digital versatile disc-recordable (DVD-R) as a recordable optical recording medium having a higher recording density than that of a compact disc-recordable (CD-R) has been under going. Both of CD-R and DVD-R are similar to each other in that an organic dye is utilized therein as a recording material and are also similar to each other in a principle of recording and reproducing of a signal (information). Therefore, the organic dyes developed for CD-R can basically comply with the various requirements (light resistance, solubility, and thermal decomposition properties) for the recording material of DVD-R other than spectroscopic properties. However, an oscillation wavelength of a semiconductor laser, which is used for recording the signal to DVD-R or for reproducing the signal from DVD-R, is in the range of 600–700 nm, which is shorter than that of the semiconductor laser which is used for CD-R. Accordingly, the recording material utilized for DVD-R should have an absorbance end of a longer wavelength side shorter than that of CD-R when it exists in the form of a membrane. Therefore, the dyes developed for CD-R such as cyanine dyes, azaannulene dyes and indoaniline-metal chelate dyes ("Electronics Related Dyes", CMC, 1998) can not be used as the recording material for DVD-R.

The present inventors have developed squarylium compounds having two different kinds of aromatic substituents in a molecule. Such squarylium compounds have a squaric acid skeleton at a center of the molecule and substituents comprising an aromatic compound on carbon atoms at two catercornered positions of the skeleton. Squarylium compounds having two same aromatic substituents are conveniently referred to as symmetric squarylium compounds (or symmetric squarylium dyes), whereas those having two different kinds of substituents are referred to as asymmetric squarylium compounds (or asymmetric squarylium dyes).

A squarylium compound known in the art wherein a metal atom is coordinated thereby forming a chelate structure is a symmetric squarylium compound having an aniline derivative represented by the formula (A) as an aromatic substituent (*Chem. Ber.* vol. 103, 3553–3562, 1970).

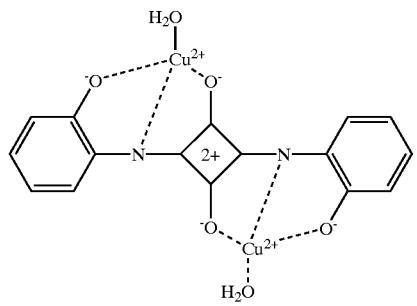

(Formula A)

However, this compound does not have a structure in which a plurality of squarylium compounds coordinate to one metal atom, and nitrogen atoms between the aromatic ring and the squaric acid skeleton are involved in coordination.

In addition, a known compound in which a plurality of squarylium analogues coordinate to one metal atom to form a chelate structure is a compound represented by the formula (B) ("OXOCARBONS", ACADEMIC PRESS 1980, p. 210, edited by Robert West).

However, in this compound, the substituents on the squaric acid skeleton are changed from an oxygen atom to an sulfur atom, and nitrogen atoms between the aromatic ring and the squaric acid skeleton are involved in coordination.

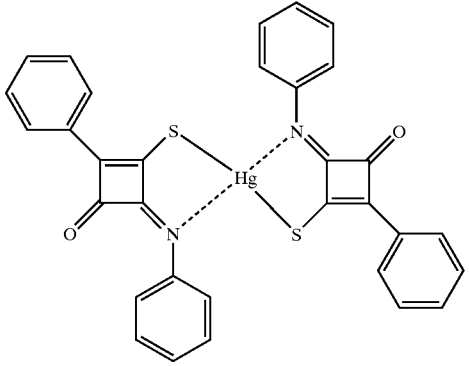

(Formula B)

Further, a complex of a compound represented by the formula (C) and a metal is known as an example which has an atom involved in coordination as a substituent on the aromatic ring, and in which a plurality of squarylium compounds and one metal atom form a complex. This complex may be used, for example, for a near infrared-ray absorbing agent, a filter for a plasma display, and the like (JP-A 2000-159776).

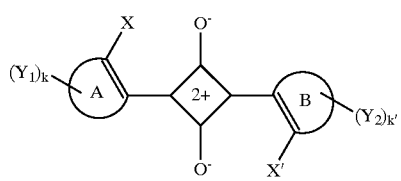

(Formula C)

(wherein X and X' represent a group having active hydrogen, $Y_1$ and $Y^2$ represent an hydrogen atom, an alkylamino group, or the like, and k and k' represent an integer of 1 to 4)

However, the above reference discloses specifically only a compound represented by the formula (D) as a squarylium compound corresponding to the formula (C). Further, no specific structure for the complex is shown therein.

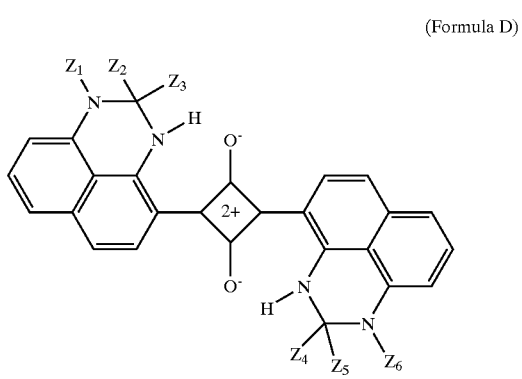

(Formula D)

(wherein $Z_1$–$Z_6$ represent a hydrogen atom, an alkyl group, or the like)

Squarylium compounds having a structure in which a plurality of squarylium compounds coordinate to one metal atom, and in which atoms involved in coordination are an oxygen atom being a substituent on the squaric acid skeleton and an atom in a substituent on an aromatic ring, have not been known yet.

In view of an oscillation wavelength of the semiconductor laser used for DVD-R, for spectroscopic properties of the recording material, which have the close relation with recording and reproducing sensitivities of the signal, it is desirable that the maximum absorption wavelength ($\lambda_{max}$) of the recording material measured in a solution state is within the range of 550–600 nm and log $\epsilon$ ($\epsilon$ is a molar extinction coefficient) at the maximum absorption wavelength is 5 or larger.

In addition, for thermal decomposition properties of the recording material, which have the close relation with the recording sensitivity, it is desirable that the recording material decomposes within the temperature range of 250–350° C.

Furthermore, although light resistance and solubility in a solvent which is necessary for membrane formation are also required as the property of the recording material, when the known squarylium compounds are used in a recording material for DVD-R, the obtained recording material for DVD-R is not sufficient for practical use in view of spectroscopic properties, light resistance, solubility and thermal decomposition properties. The above-mentioned compound A has a melting point of 350° C. or higher, and the compound C has a maximum absorption wavelength of 830 nm or longer. There are no property data for the compound B.

DISCLOSURE OF THE INVENTION

An object of the present invention is to provide squarylium compounds having spectroscopic properties, light resistance, solubility and thermal decomposition properties suitable for a recording material for DVD-R, and optical recording media using the same.

In view of the above situation, the present inventors intensively investigated and, as the result, we have found that a suqarylium compound having hydroxypyrazole as an aromatic substituent and a metal atom with a coordination ability form a chelate complex, and obtained a finding that compounds obtained by forming such a chelate complex have properties suitable for a recording material for DVD-R.

The present invention was done based on such a finding, and provides squarylium compounds represented by the formula (I):

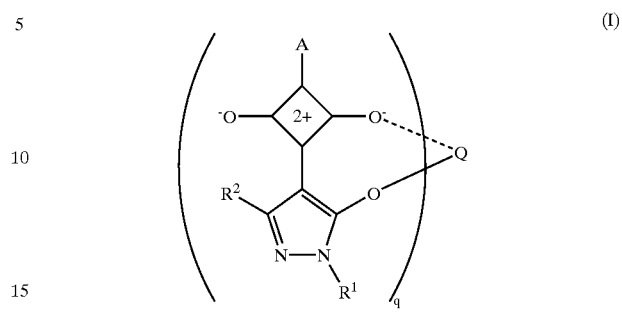

(I)

wherein, $R^1$ and $R^2$ are the same or different, and represent an alkyl group optionally having a substituent, an aralkyl group optionally having a substituent, an aryl group optionally having a substituent, or a heterocyclic group optionally having a substituent; Q represents a metal atom with a coordination ability; q represents 2 or 3; and A represents an aryl group optionally having a substituent, a heterocyclic group optionally having a substituent, or Y=CH— wherein Y represents an aryl group optionally having a substituent or a heterocyclic group optionally having a substituent, and optical recording media which has a recording layer comprising said squarylium compound.

The present invention will be illustrated below, and herein the compound represented by the formula (I) is referred to as a compound (I). This is also applicable to compounds with other formula numbers added.

First, in the definitions of the respective groups in the above formula (I) or the formula (II) described below, an alkyl part of the alkyl and alkoxy groups includes straight or branched alkyl groups having from 1 to 6 carbon atoms and cyclic alkyl groups having from 3 to 8 carbon atoms, such as methyl, ethyl, propyl, iso-propyl, butyl, iso-butyl, sec-butyl, tert-butyl, pentyl, iso-pentyl, 1-methylbutyl, 2-methylbutyl, tert-pentyl, hexyl, cyclopropyl, cyclobutyl, cyclopentyl, cyclohexyl, cycloheptyl and cyclooctyl groups, and the like.

Examples of the aralkyl group include aralkyl groups having from 7 to 15 carbon atoms, such as benzyl, phenethyl, phenylpropyl and naphthylmethyl groups, and the like.

Examples of the aryl group include phenyl, naphthyl, anthryl and azulenyl groups, and the like.

The halogen atom includes chlorine, bromine, fluorine and iodine atoms.

The substituents for the aralkyl group, the aryl group, the alkoxy group, the aromatic ring, the heterocyclic ring or the heterocyclic group are the same or different 1 to subtutituents, and include a hydroxyl group, a carboxyl group, a halogen atom, an alkyl group optionally having a substituent, an alkoxy group, a nitro group, an amino group optionally having a substituent, and the like, wherein the halogen atom, the alkyl group and the alkoxy group include those as described above.

The substituents for the alkyl group are the same or different 1 to 3 substituents, and include a hydroxyl group, a carboxyl group, a halogen atom, an alkoxy group, and the like, wherein the halogen atom and the alkoxy group include those as described above. Further, the substituents for the alkyl group include substituents for the alkyl group as described below.

The substituents for the amino group are the same or different 1 or 2 alkyl groups, wherein the alkyl group includes those as described above.

Examples of the metal atom with a coordination ability include aluminium, zinc, copper, iron, nickel, chromium, cobalt, manganese, iridium, vanadium, titanium, and the like. Among them, preferred are trivalent metals (e.g., aluminium, iron (III), chromium (III), cobalt (III), manganese (III), iridium (III), vanadium (II), and the like). Aluminium is more preferable.

The aromatic ring which is formed by two adjacent $R^6$s being taken together with two adjacent carbon atoms includes a benzene ring, a naphthalene ring, an anthracene ring, and the like.

The heterocycle in the heterocyclic group or the heterocycle which is formed by $R^3$ and $R^4$ being taken together with an adjacent carbon atom includes 5- or 6-membered monocyclic aromatic or aliphatic heterocycles containing at least one atom selected from nitrogen, oxygen and sulfur atoms, fused di- or tri-cyclic aromatic heterocycles, which are formed by fusing 3- to 8-membered rings and which contain at least one atom selected from nitrogen, oxygen and sulfuir atoms, and the like, and, more particularly, includes pyridine, pyrazine, pyrimidine, pyridazine, quinoline, isoquinoline, phthalazine, quinazoline, quinoxaline, naphthyridine, cinnoline, pyrrole, pyrazole, imidazole, triazole, tetrazole, thiophene, furan, thiazole, oxazole, indole, isoindole, indazole, benzimidazole, benzotriazole, benzothiazole, benzoxazole, purine, carbazole, pyrrolidine, piperidine, piperazine, morpholine, thiomorpholine, homopiperidine, homopiperazine, tetrahydropyridine, tetrahydroquinoline, tetrahydroisoquinoline, tetrahydrofuran, tetrahydropyran, dihydrobenzofuran, tetrahydrocarbazole, indoline rings, and the like.

Examples of the alicyclic hydrocarbon ring which is formed by $R^3$ and $R^4$ being taken together with an adjacent carbon atom include saturated or unsaturated alicyclic hydrocarbon rings having from 3 to 8 carbon atoms, such as cyclopropane, cyclobutane, cyclopentane, cyclohexane, cycloheptane, cyclooctane, cyclopentene, 1,3-cyclopentadiene, cyclohexene and cyclohexadiene rings, and the like.

In the compound (I), a compound wherein Y is an indoline ring optionally having a substituent is preferred, and, among them, more preferred is a compound wherein Y=CH— is represented by the general formula (II):

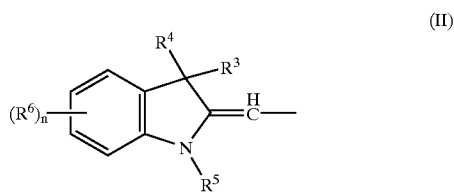

(II)

wherein $R^3$ and $R^4$ are the same or different, and represent an alkyl group optionally having a substituent, or $R^3$ and $R^4$ may be taken together with an adjacent carbon atom to form an alicyclic hydrocarbon ring or a heterocycle optionally having a substituent; $R^5$ represents a hydrogen atom, an alkyl group optionally having a substituent, an aralkyl group optionally having a substituent or an aryl group optionally having a substituent; $R^6$ represents a halogen atom, an alkyl group optionally having a substituent, an aralkyl group optionally having a substituent, an aryl group optionally having a substituent, a nitro group, a cyano group or an alkoxy group optionally having a substituent; and n represents an integer of 0–4, and when n is 2–4, then $R^6$s are the same or different, or two adjacent $R^6$s may be taken together with two adjacent carbon atoms to form an aromatic ring optionally having a substituent.

A general method for preparing the compound (I) is explained below.

Scheme (1-a)

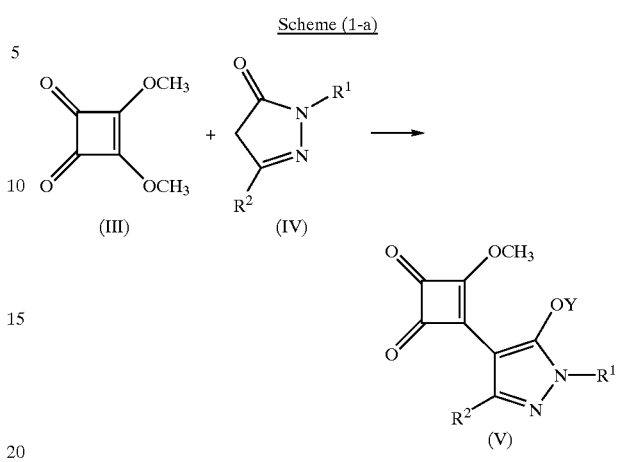

Scheme (1-b)

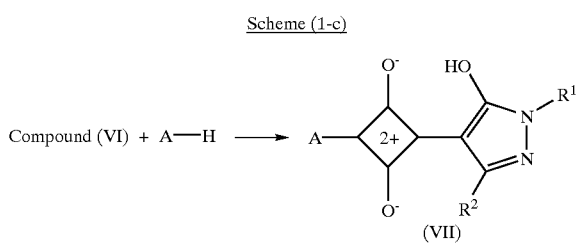

Scheme (1-c)

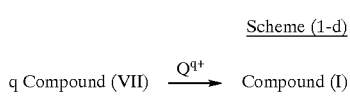

Scheme (1-d)

q Compound (VII) $\xrightarrow{Q^{q+}}$ Compound (I)

(wherein $R^1$, $R^2$, A, Q and q are the same as defined above, and Y represents a hydrogen atom, potassium, sodium, or the like)

Scheme (1-a)

The compound (V) is prepared by reacting the compound (III) with 0.7- to 1.5-fold moles of the compound (IV) at 0–80° C. for 5 minutes to 15 hours in a solvent, if needed, in the presence of a base.

Examples of the base to be used include inorganic bases such as potassium carbonate, sodium carbonate, potassium hydroxide and the like, and organic bases such as triethylamine, sodium methoxide, and the like, and so on. A preferred amount of the base to be used is 0.7- to 1.5-fold moles relative to the compound (III).

Examples of the solvent to be used include methanol, ethanol, dimethylformamide, and the like.

Scheme (1-b)

The compound (VI) is prepared by treating the compound (V) at 0–80° C. for 30 minutes to 15 hours in an alkaline solvent or in an acidic solvent.

Examples of the alkaline solvent to be used include an aqueous potassium carbonate solution an aqueous sodium carbonate solution, an aqueous potassium hydroxide solution, and the like.

Examples of the acidic solvent to be used include a 50 volume/volume % solution of hydrochloric acid in aqueous dimethyl sulfoxide, a 50 volume/volume % solution of hydrochloric acid in aqueous dimethylformamide, and the like.

Scheme (1-c)

The compound (VII) is prepared by reacting the compound (VI) with 0.5- to 2-fold moles of A-H at 50–120° C. for 5 minutes to 15 hours in a solvent, if needed, in the presence of 0. 5- to 2-fold moles of a base.

Examples of the solvent to be used include alcoholic solvents alone having from 2 to 8 carbon atoms such as ethanol, propanol, iso-propyl alcohol, butanol, octanol, and the like, and a mixture of the alcoholic solvent with benzene, toluene or xylene (50 volume/volume % or more of the alcoholic solvent is preferable).

Examples of the base to be used include organic bases such as quinoline, triethylamine, pyridine, and the like, and inorganic bases such as potassium carbonate, potassium hydrogen carbonate, sodium hydrogen carbonate, and the like, and so on.

Scheme (1-d)

The compound (I) is prepared by reacting the compound (VII) with a material providing $Q^{q+}$ at room temperature to 120° C. for 5 minutes to 15 hours in a solvent, if needed, in the presence of 0.5- to 2-fold moles of acetic acid. It is preferred that the material providing $Q^{q+}$ is used so that the ratio of the mole number of the compound (VII): (the mole number of the material providing $Q^{q+}$)×q is 1:0.5–2.

Examples of the material providing $Q^{q+}$ to be used include aluminium tris(acetylacetonate), aluminum tris (ethylacetoacetate), aluminum isopropoxide, aluminium sec-butoxide, aluminium ethoxide, aluminium chloride, copper chloride, copper acetate, nickel acetate, and the like.

Examples of the solvent to be used include halogen solvents such as chloroform, dichloromethane, and the like; aromatic solvents such as toluene, xylene, and the like; ethers such as tetrahydrofuran, methyl tert-butyl ether and the like; esters such as ethyl acetate, and the like, and so on.

Embodiments of the compound (I) are shown in Table 1. Additionally, the compound numbers in the table correspond to the Example numbers described below. Further, in the table, "Ph" represents a phenyl group, "Me" represents a methyl group, "Pr" represents a propyl group, and "ⁱPr" represents an isopropyl group.

TABLE 1

Embodiments of the compounds

| Example No. | $R^1$ | $R^2$ | A | Q | q |
|---|---|---|---|---|---|
| 1 | Ph | Pr | 5-Cl-3,3-dimethyl-1-methyl-2-methylene-indoline | Al | 3 |
| 2 | Ph | ⁱPr | 5-Cl-3,3-dimethyl-1-methyl-2-methylene-indoline | Al | 3 |
| 3 | Me | Pr | 5-Cl-3,3-dimethyl-1-methyl-2-methylene-indoline | Al | 3 |
| 4 | Ph | Me | 3,3-dimethyl-1-methyl-2-methylene-indoline | Al | 3 |
| 5 | Ph | Me | 5-Cl-3,3-dimethyl-1-methyl-2-methylene-indoline | Al | 3 |
| 6 | Me | ⁱPr | 5-Cl-3,3-dimethyl-1-methyl-2-methylene-indoline | Al | 3 |
| 7 | Ph | Pr | 5-Br-3,3-dimethyl-1-methyl-2-methylene-indoline | Al | 3 |
| 8 | 3-MeC₆H₄ | Me | 5-Cl-3,3-dimethyl-1-methyl-2-methylene-indoline | Al | 3 |
| 9 | 4-MeC₆H₄ | Me | 5-Cl-3,3-dimethyl-1-methyl-2-methylene-indoline | Al | 3 |

TABLE 1-continued

Embodiments of the compounds

| Example No. | R¹ | R² | A | Q | q |
|---|---|---|---|---|---|
| 10 | 3-MeC₆H₄ | Pr | 3,3-dimethyl-1-methyl-2-methyleneindoline | Al | 3 |
| 11 | 3-MeC₆H₄ | Pr | 5-chloro-3,3-dimethyl-1-methyl-2-methyleneindoline | Al | 3 |
| 12 | 4-MeC₆H₄ | Pr | 5-chloro-3,3-dimethyl-1-methyl-2-methyleneindoline | Al | 3 |
| 13 | Ph | Pr | 1,1-dimethyl-3-methyl-2-methylene-benz[e]indoline | Al | 3 |
| 14 | 4-BrC₆H₄ | Pr | 5-chloro-3,3-dimethyl-1-methyl-2-methyleneindoline | Al | 3 |
| 15 | 4-BrC₆H₄ | Pr | 1,1-dimethyl-3-methyl-2-methylene-benz[e]indoline | Al | 3 |
| 16 | 4-ClC₆H₄ | Pr | 1,1-dimethyl-3-methyl-2-methylene-benz[e]indoline | Al | 3 |
| 17 | Ph | Ph | 5-chloro-3,3-dimethyl-1-methyl-2-methyleneindoline | Al | 3 |
| 18 | 4-MeOC₆H₄ | Ph | 5-chloro-3,3-dimethyl-1-methyl-2-methyleneindoline | Al | 3 |
| 19 | 4-ClC₆H₄ | Pr | 5-chloro-3,3-dimethyl-1-methyl-2-methyleneindoline | Al | 3 |
| 20 | 3-ClC₆H₄ | Pr | 6-chloro-3,3-dimethyl-1-methyl-2-methyleneindoline | Al | 3 |
| 21 | Ph | CF₃ | 1,1-dimethyl-3-methyl-2-methylene-benz[e]indoline | Al | 3 |
| 22 | 3-ClC₆H₄ | Pr | 1,1-dimethyl-3-methyl-2-methylene-benz[e]indoline | Al | 3 |
| 23 | 4-FC₆H₄ | Pr | 1,1-dimethyl-3-methyl-2-methylene-benz[e]indoline | Al | 3 |
| 24 | 4-FC₆H₄ | Pr | 5-chloro-3,3-dimethyl-1-methyl-2-methyleneindoline | Al | 3 |
| 25 | 4-CF₃C₆H₄ | Pr | 5-chloro-3,3-dimethyl-1-methyl-2-methyleneindoline | Al | 3 |
| 26 | 4-ClC₆H₄ | Me | 1,1-dimethyl-3-methyl-2-methylene-benz[e]indoline | Al | 3 |

TABLE 1-continued

Embodiments of the compounds

| Example No. | R¹ | R² | A | Q | q |
|---|---|---|---|---|---|
| 27 | 4-FC₆H₄ | Me | (naphthoindoline, Me,Me; N-Me) | Al | 3 |
| 28 | 4-CF₃C₆H₄ | Pr | (naphthoindoline, Me,Me; N-Me) | Al | 3 |
| 29 | Ph | Pr | (5-MeO indoline, Me,Me; N-Me) | Al | 3 |
| 30 | Ph | CF₃ | (5-Cl indoline, Me,Me; N-Me) | Al | 3 |
| 31 | Me | Me | (naphthoindoline, Me,Me; N-Me) | Al | 3 |
| 32 | Ph | Pr | (indoline, Me,Me; N-H) | Al | 3 |
| 33 | Ph | CF₃ | (6-MeO indoline, Me,Me; N-Me) | Al | 3 |
| 34 | Ph | CF₃ | (6-Me indoline, Me,Me; N-Me) | Al | 3 |
| 35 | Ph | CF₃ | (spiro-cyclohexyl indoline; N-Me) | Al | 3 |
| 36 | Ph | Pr | (4,6-diCl indoline, Me,Me; N-Me) | Al | 3 |

Next, the constitution of a recording medium utilizing the squarylium compound of the present invention (hereinafter, it may be referred to as "a compound of the present invention") will be illustrated.

The physical properties required for a material for a recording layer include optical and thermal properties, as well as light resistance.

The optical properties are preferably such that there is a large absorption band at a shorter wavelength side than 600–700 nm, preferably 630–690 nm, which is a recording or reproducing wavelength of DVD-R or the like, and, further a recording or reproducing wavelength is in the vicinity of a longer wavelength end of the above-mentioned absorption band. This means that the above-mentioned material for the recording layer has a larger refractive index and extinction coefficient within 600–700 nm, which is a recording or reproducing wavelength.

More specifically, the refractive index "n" of a single layer of the recording layer is preferably 1.5–3.0, and the extinction coefficient "k" of a single layer of the recording layer is preferably within the range of 0.02–0.3, for the light of the wavelength range of the recording or reproducing wavelength±5 nm in the vicinity of the longer wavelength end of the above-mentioned absorption band. When "n" is 1.5 or larger, a reflectance and a modulation percentage of recording become higher, and when "n" is 3.0 or smaller, an error does not occur with the light in the recording or reproducing wavelength range. In addition, when "k" is 0.02 or larger, the recording sensitivity is improved, and when "k" is 0.3 or smaller, the reflectance of 50% or larger can be easily obtained.

In addition, the maximum absorption wavelength ($\lambda_{max}$) of the material for the recording layer which is measured in a chloroform solution is preferably within the range of 550–600 nm, and since a larger extinction coefficient allows for the larger refractive index "n", log ε (ε is a molar extinction coefficient) at the maximum absorption wavelength is preferably 5 or larger.

Further, for the thermal properties, it is preferred that the decomposition temperature is within the particular temperature range. More specifically, the decomposition temperature is preferably 350° C. or lower, and more preferably within the range of 250–350° C. When the decomposition temperature is 350° C. or lower, it is not necessary to raise the power of the recording laser beam, and when it is 250° C. or higher, it is preferable in a recording stability sense.

Still further, for the light resistance, it is preferred that the material has a reproducing property constant for over 1,000,000 repeats and a fastness property in which no color fading occurs when the material is left in a room.

The preferable substrate shape is under the condition that a track pitch is within the range of 0.7–0.8 μm and a groove width at the half band width is within the range of 0.18–0.40 μm.

It is preferred that the substrate has a guiding groove having a depth of 1,000–2,500 Å. It is preferred that the track pitch is 0.7–1.0 μm, and more preferably 0.7–0.8 μm for the high recording density application. The groove width is preferably 0.18–0.40 μm as the half band width. When the groove width is 0.18 μm or wider, the adequate strength of a tracking error signal can be easily detected, whereas when it is 0.40 μm or narrower, the recording portion is hardly widened in a traverse direction upon recording, being preferable.

1. The Structure of an Optical Recording Medium

The optical recording medium of the present invention may be formed into an air-sandwich structure or into a closely adhered structure which is applied to general recordable discs, or may be formed into a structure of a recordable optical recording medium such as DVD-R, or the like.

2. The Required Properties and Embodiments of Constituent Materials for Each Layer The optical recording medium of the present invention has a basic structure in which a first substrate and a second substrate are adhered via a recording layer with an adhesive. The recording layer may be a single layer of an organic dye layer comprising the compound of the present invention, or may be a laminated layer of the organic dye layer and a metal reflective layer for enhancing the reflectance. Between the recording layer and the substrate, an undercoat layer or a protective layer may be built-up, or they may be laminated for improving the function. Preferred structures include the first substrate/the organic dye layer/the metal reflective layer/the protective layer/the adhesive layer/the second substrate and the like.

a. Substrate

The substrate to be used should be transmittable to the wavelength of the laser beam to be used when recording or reproducing is conducted from a substrate side, but it is not necessary for the substrate to be transmittable to the wavelength when recording or reproducing is conducted from a recording layer side. As the material for the substrate, for example, plastics such as polyester, acrylic resin, polyamide, polycarbonate resin, polyolefin resin, phenolic resin, epoxy resin, polyimide, or the like, glasses, ceramics, metals or the like may be used. Additionally, a guiding groove or a guiding pit for tracking, a preformat such as an addressing signal, or the like may be formed on a surface of the substrate.

b. Recording Layer

The recording layer is a layer in which some optical change is caused by irradiation with a laser beam and, thereby, an information is recorded, and should contain the compound of the present invention. The compounds of the present invention may be used alone or in combination of two or more for forming the recording layer.

In addition, the compound of the present invention may be used by mixing it or laminating it with other organic dyes, metals or metal compounds for the purpose of enhancement of the optical properties, the recording sensitivity, the signal properties, or the like. Examples of the organic dye include a polymethine dye, naphthalocyanine, phthalocyanine, squarylium, croconium, pyrylium, naphthoquinone, anthraquinone (indanthrene), xanthene, triphenylmethane, azulene, tetrahydrocholine, phenanthrene and triphenothiazine dyes, metal complex compounds, and the like. Examples of the metal and metal compound include In, Te, Bi, Se, Sb, Ge, Sn, Al, Be, $TeO_2$, SnO, As, Cd, and the like, each of which may be used in the form of dispersion mixture or lamination.

In addition, it is possible to enhance the light resistance significantly by mixing a light stabilizer into the compound of the present invention. As the light stabilizer, metal complexes and aromatic amines are preferable. Embodiments of the light stabilizer will be listed below (see Tables 2 and 3).

The mixing ratio of the light stabilizer relative to the compound of the present invention is preferably 5–40% by weight. When the ratio is 5% by weight or larger, the effect on light stabilization is high, and it is preferred that the ratio is 40% by weight or smaller in view of the recording or reproducing properties.

In addition, macromolecular materials, for example, various materials such as ionomer resin, polyamide resin, vinyl resin, natural polymer, silicone or liquid rubber, or silane coupling agents may be dispersed and mixed into the compound of the present invention, and additives such as stabilizers (for example, transition metal complex), dispersing agents, flame retardants, lubricants, antistatic agents, surfactants or plasticizers may be used together for the purpose of modifying the properties.

The recording layer may be formed using conventional methods such as a deposition, a sputtering, a chemical vapor deposition or a solvent coating. In the case where the coating method is used, the dye comprising the compound of the present invention with the aforementioned additives added optionally is dissolved in an organic solvent, and the solution is coated by the conventional coating method such as a spraying, a roller coating, a dipping or a spin coating.

Examples of the organic solvent to be used generally include alcohols such as methanol, ethanol and iso-propanol, ketones such as acetone, methyl ethyl ketone and cyclohexanone, amides such as N,N-dimethylformamide and N,N-dimethylacetoamide, sulfoxides such as dimethyl sulfoxide, ethers such as tetrahydroftiran, dioxane, diethyl ether and ethyleneglycol monomethyl ether, esters such as methyl acetate and ethyl acetate, aliphatic halogenated hydrocarbons such as chloroform, methylene chloride, dichloroethane, carbon tetrachloride and trichloroethane, aromatic compounds such as benzene, xylene, monochlorobenzene and dichlorobenzene, cellosolves such as methoxyethanol and ethoxyethanol, and hydrocarbons such as hexane, pentane, cyclohexane and methylcyclohexane.

The membrane thickness of the recording layer is preferably 100 Å-10 μm, more preferably 200–2,000 Å.

Embodiments of the light stabilizer to be used in combination with the compound of the present invention are listed below.

(1) Metal Complex-light Stabilizers (See Table 2)

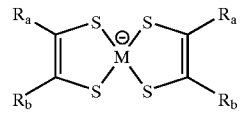
(A)

wherein $R_a$ and $R_b$ are the same or different, and represent a hydrogen atom, an alkyl group, an aryl group or a heterocyclic group, wherein said alkyl group, said aryl group or said heterocyclic group may have a substituent.

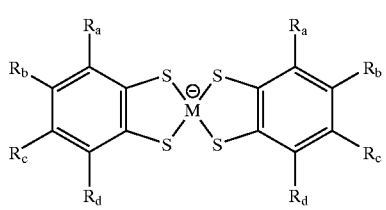
(B)

wherein $R_a$, $R_b$, $R_c$ and $R_d$ are the same or different, and represent a hydrogen atom, a halogen atom, an alkyl group, an aryl group, a cyclic alkyl group or a heterocyclic group, wherein said alkyl group, said aryl group, said cyclic alkyl group or said heterocyclic group is bound directly or indirectly via a divalent linking group.

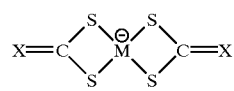
(C)

wherein X represents O, S or $CR_aR_b$, wherein $R_a$ and $R_b$ are the same or different, and represent CN, $COR_c$, $COOR_d$, $CONR_eR_f$, $SO_2R_g$, or a group of atoms necessary for forming a 5- or 6-membered ring, and wherein $R_c\sim R_g$ are the same or different, and represent an alkyl group or an aryl group, wherein said alkyl group or said aryl group may have a substituent.

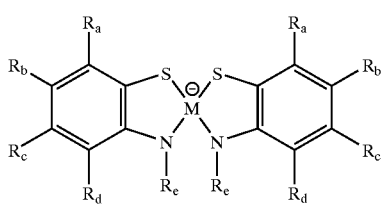
(D)

wherein $R_a$, $R_b$, $R_c$ and $R_d$ are the same or different, and represent a hydrogen atom, a halogen atom, an alkyl group, an aryl group, a cyclic alkyl group or a heterocyclic group, wherein said alkyl group, said aryl group, said cyclic alkyl group or said heterocyclic group is bound directly or indirectly via a divalent linking group, and Re represents a hydrogen atom, an alkyl group, an aryl group, an acyl group, a carboxyl group, an alkoxycarbonylalkyl group or a sulfo group.

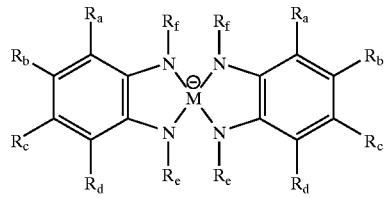
(E)

wherein $R_a$, $R_b$, $R_c$ and $R_d$ are the same or different, and represent a hydrogen atom, a halogen atom, an alkyl group, an aryl group, a cyclic alkyl group or a heterocyclic group, wherein said alkyl group, said aryl group, said cyclic alkyl group or said heterocyclic group is bound directly or indirectly via a divalent linking group, and $R_e$ and $R_f$ are the same or different, and represent a hydrogen atom, an alkyl group, an aryl group, an acyl group, a carboxyl group or a sulfo group.

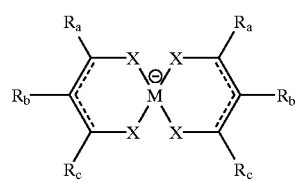
(F)

wherein X represents O or S, $R_a$, $R_b$ and Re are the same or different, and represent an alkyl group, an aryl group or a cyclic alkyl group, wherein said alkyl group, said aryl group or said cyclic alkyl group may have a substituent which is bound directly or via an oxy group, a thio group or an amino group, and the symbol: C-----C-----C represents C=C—C or C—C=C.

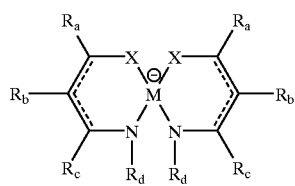
(G)

wherein X represents O or S, $R_a$, $R_b$ and $R_c$ are the same or different, and represent an alkyl group an aryl group or a cyclic alkyl group, wherein said alkyl group, said aryl group or said cyclic alkyl group may have a substituent which is bound directly or via an oxy group, a thio group or an amino group, $R_b$ represents an alkyl group or an aryl group, and the symbol: C-----C-----C represents C=C—C or C—C=C.

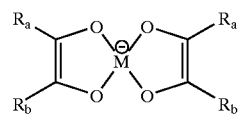
(H)

wherein $R_a$ and $R_b$ are the same or different, and represent a hydrogen atom, an alkyl group, an aryl group or a heterocyclic group, wherein said alkyl group, said aryl group or said heterocyclic group may have a substituent.

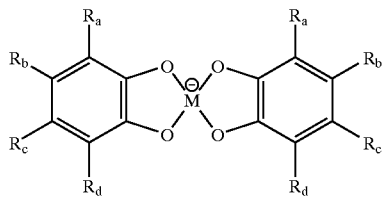

(I)

wherein $R_a$, $R_b$, $R_c$ and $R_d$ are the same or different, and represent a hydrogen atom, a halogen atom, an alkyl group, an aryl group, a cyclic alkyl group or a heterocyclic group, wherein said alkyl group, said aryl group, said cyclic alkyl group or said heterocyclic group is bound directly or indirectly via a divalent linking group.

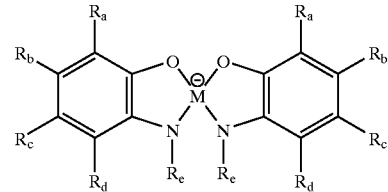

(J)

wherein $R_a$, $R_b$, $R_c$ and $R_d$ are the same or different, and represent a hydrogen atom, a halogen atom, an alkyl group, an aryl group, a cyclic alkyl group or a heterocyclic group, wherein said alkyl group, said aryl group or said cyclic alkyl group is bound directly or indirectly via a divalent linking group, Re represents a hydrogen atom, an alkyl group, an aryl group, an acyl group, a carboxyl group or a sulfo group.

In the formulae (A)–(J), M represents a transition metal such as Ni, Pd, Pt, Cu, Co, or the like, and may have a charge to form a salt with a cation, and in addition, other ligands may be bonded above or below M. Such salts may be used also as a light stabilizer. The alkyl, cyclic alkyl, aryl and heterocyclic groups and substituents therefor include those described above.

More preferable embodiments are shown in Table 2.

TABLE 2

Embodiments of metal complex-light stabilizers

| Metal Complex Nos. | Corresponding Structure | $R_a$ | $R_b$ | $R_c$ | $R_d$ | $R_e$ | $R_f$ | X | M | Counter Cation |
|---|---|---|---|---|---|---|---|---|---|---|
| 1 | (A) | Ph | Ph | — | — | — | — | — | Cu | $NBu_4$ |
| 2 | (A) | $C_4H_9$ | $C_4H_9$ | — | — | — | — | — | Ni | — |
| 3 | (B) | Cl | H | Cl | Cl | — | — | — | Ni | $NBu_4$ |
| 4 | (B) | H | $OCH_3$ | H | H | — | — | — | Cu | — |
| 5 | (C) | — | — | — | — | — | — | O | Co | $NBu_4$ |
| 6 | (C) | — | — | — | — | — | — | S | Ni | CN |
| 7 | (D) | H | $OCH_3$ | H | H | $CH_2COOEt$ | — | — | Pd | $NBu_4$ |
| 8 | (D) | H | H | H | H | $CH_3$ | — | — | Ni | $PBu_4$ |
| 9 | (D) | H | $CH_3$ | H | H | $CH_3$ | — | — | Pt | $NPe_4$ |
| 10 | (E) | H | H | H | H | $CH_3$ | $CH_3$ | — | Ni | $NBu_4$ |
| 11 | (E) | H | $OCH_3$ | H | H | $C_2H_5$ | $C_2H_5$ | — | Pt | $NEt_4$ |
| 12 | (F) | H | H | H | — | — | — | O | Cu | $NBu_4$ |
| 13 | (F) | H | H | H | — | — | — | O | Ni | $PBu_4$ |
| 14 | (F) | H | Ph | H | — | — | — | S | Ni | $NOc_4$ |
| 15 | (G) | H | H | H | H | — | — | O | Ni | $NBu_4$ |
| 16 | (G) | H | H | H | H | — | — | S | Ni | $PEt_4$ |
| 17 | (H) | Ph | Ph | — | — | — | — | — | Pd | $NBu_4$ |
| 18 | (I) | H | H | H | H | — | — | — | Ni | $NBu_4$ |
| 19 | (I) | H | $OCH_3$ | H | H | — | — | — | Ni | $PEt_4$ |
| 20 | (J) | H | H | H | H | $CH_3$ | — | — | Ni | $NBu_4$ |
| 21 | (J) | H | H | H | H | $C_4H_9$ | — | — | Ni | $PBu_4$ |
| 22 | (J) | H | $CH_3$ | H | H | $C_4H_9$ | — | — | Cu | $NOc_4$ |

Et: ethyl group, Bu: butyl group; Pe: pentyl group, Oc: octyl group, and Ph: phenyl group (2) Aromatic Amine-light Stabilizers (See Table 3)
Following compounds may be used.

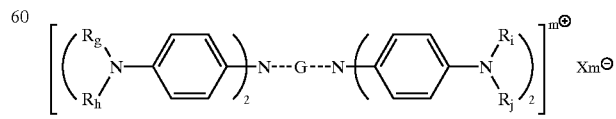

wherein $R_g$, $R_h$, $R_i$ and $R_j$ are the same or different, and each represents a hydrogen atom, or an alkyl group optionally having a substituent, X represents an acid anion, and G is, when m is 1 or 2,

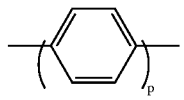

wherein p is 1 or 2, and is, when m is 2,

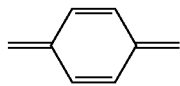

wherein all of existing aromatic rings may be substituted with an alkyl group having from 1 to 6 carbon atoms, an alkoxy group having from 1 to 6 carbon atoms, a halogen atom or a hydroxyl group.

More preferred embodiments are shown in Table 3.

TABLE 3

Embodiments of aminium, imonium and diimonium compounds

| Compound Nos. | $R_g$ | $R_h$ | $R_i$ | $R_j$ | G | X | m |
|---|---|---|---|---|---|---|---|
| 101 | $C_2H_5$ | $C_2H_5$ | $C_2H_5$ | $C_2H_5$ | Z1, p = 2 | $ClO_4$ | 1 |
| 102 | $C_2H_5$ | $C_2H_5$ | $C_2H_5$ | $C_2H_5$ | Z1, p = 1 | $SbF_6$ | 1 |
| 103 | $C_3H_7$ | $C_3H_7$ | $C_3H_7$ | $C_3H_7$ | Z1, p = 1 | Br | 1 |
| 104 | $C_3H_7$ | $C_3H_7$ | $C_3H_7$ | $C_3H_7$ | Z1, p = 2 | $PF_6$ | 1 |
| 105 | $C_4H_9$ | $C_4H_9$ | $C_4H_9$ | $C_4H_9$ | Z1, p = 1 | $ClO_4$ | 1 |
| 106 | $C_3H_7$ | H | $C_3H_7$ | H | Z1, p = 1 | $ClO_4$ | 1 |
| 107 | $C_2H_5$ | $C_2H_5$ | $C_2H_5$ | $C_2H_5$ | Z1, p = 2 | Cl | 1 |
| 108 | $C_6H_{13}$ | H | $C_6H_{13}$ | H | Z1, p = 1 | $SbF_6$ | 1 |
| 109 | $C_6H_{13}$ | H | $C_6H_{13}$ | H | Z1, p = 1 | $ClO_4$ | 1 |
| 110 | $C_2H_5$ | $C_2H_5$ | $C_2H_5$ | $C_2H_5$ | Z1, p = 1 | $SbF_6$ | 1 |
| 111 | $C_3H_7$ | $C_3H_7$ | $C_3H_7$ | $C_3H_7$ | Z1, p = 2 | $ClO_4$ | 1 |
| 112 | $C_2H_5$ | $C_2H_5$ | $C_2H_5$ | $C_2H_5$ | Z2 | $PF_6$ | 2 |
| 113 | $C_2H_5$ | $C_2H_5$ | $C_2H_5$ | $C_2H_5$ | Z2 | $ClO_4$ | 2 |
| 114 | $C_3H_7$ | $C_3H_7$ | $C_3H_7$ | $C_3H_7$ | Z2 | $SbF_6$ | 2 |
| 115 | $C_3H_7$ | H | $C_3H_7$ | H | Z2 | $AsF_6$ | 2 |
| 116 | $C_4H_9$ | $C_4H_9$ | $C_4H_9$ | $C_4H_9$ | Z2 | I | 2 |
| 117 | $C_6H_{13}$ | H | $C_6H_{13}$ | H | Z2 | $ClO_4$ | 2 |

Z1:

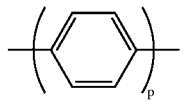

Z2:

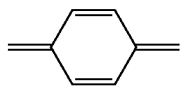

c. Undercoat Layer

The undercoat layer is used for the purpose of (1) an improvement in adherability, (2) a barrier against water, gases, or the like, (3) an improvement in the tability of the recording layer, (4) an enhancement of the reflectance, (5) a protection of the substrate from a solvent, (6) a formation of a guiding groove, guiding pit or preformat, or the like. With regard to the purpose of (1), macromolecular materials, for example, various polymers such as ionomer resin, polyamide resin, vinyl resin, natural resin, natural polymer, silicone, liquid rubber, or the like, silane coupling agents, or the like may be used. With regard to the purposes of (2) and (3), in addition to the aforementioned macromolecular materials, inorganic compounds such as SiO, MgF, $SiO_2$, TiO, ZnO, TiN, SiN, or the like, and further metals or semimetals such as Zn, Cu, Ni, Cr, Ge, Se, Au, Ag, Al, or the like may be used. In addition, with regard to the purpose of (4), metals such as Al, Au, Ag, or the like, or organic films having metallic luster such as a methine dye, a xanthene dye, or the like may be used. With regard to the purposes of (5) and (6), a ultraviolet-curing resin, a thermosetting resin, a thermoplastic resin, or the like may be used.

The membrane thickness of the undercoat layer is preferably 0.01–30 μm, more preferably 0.05–10 μm.

d. Metal Reflective Layer

Examples of the material for the metal reflective layer include poorly erodable metals, semimetals, and the like exhibiting a high reflectance themselves. Embodiments of the material for the metal reflective layer include Au, Ag, Cr, Ni, Al, Fe, Sn, and the like, but Au, Ag and Al are most preferred from a viewpoint of the reflectance and productivity. These metals or semimetals may be used alone or as an alloy of two of them.

The method for forming a membrane includes a vapor deposition, a sputtering, and the like. The membrane thickness of the metal reflective layer is preferably 50–5,000 Å, more preferably 100–3,000 Å.

e. Protective Layer, Substrate Surface-hard Coating Layer

A protective layer and a substrate surface-hard coating layer are used for the purpose of (1) a protection of the recording layer (reflection absorbing layer) from flaw, dust, dirt or the like, (2) an improvement in the storage stability of the recording layer (reflection absorbing layer), (3) an improvement in the reflectance, or the like. With regard to such purposes, the materials described for the undercoat layer may be used. In addition, SiO, $SiO_2$ or the like may be used as an inorganic material, and thermo-softening resins such as polymethyl acrylate, polycarbonate, polystyrene, polyester, vinyl resin, cellulose, aliphatic hydrocarbons, natural rubber, styrene-butadiene, chloroprene rubber, wax, alkyd, drying oil, or rosin, thermosetting resins such as epoxy resin, phenol resin, polyurethane resin, melamine resin, or urea resin, ultraviolet-curing resins such as polyester acrylate, epoxy acrylate, urethane acrylate, or silicone acrylate, or the like may be used as an organic material, but among them, the ultraviolet-curing resins may be preferably used in that they have the excellent productivity.

The membrane thickness of the protective layer or the substrate surface-hard coating layer is preferably 0.01–30 μm, more preferably 0.05–10 μm. In the present invention, stabilizers, dispersing agents, flame retardants, lubricants, antistatic agents, surfactants, plasticizers or the like may be incorporated into the above undercoat layer, protective layer and substrate surface-hard coating layer as described for the recording layer.

f. Protective Substrate

A protective substrate should be transmittable to the wavelength of the laser beam to be used when the laser beam is irradiated from this protective substrate side, whereas it may be transmittable or not to the wavelength when it is used as a mere protective plate. The materials which may be used for the protective substrate are the same as those for the substrate, and plastics such as polyester, acrylic resin, polyamide, polycarbonate resin, polyolefin resin, phenol resin, epoxy resin, or polyimide, or the like, glasses, ceramics, metals, or the like may be used.

g. Adhesive, Adhesive Layer

As the adhesive, any material which can adhere two recording media may be used, but from a viewpoint of the productivity, ultraviolet-curing or hot melt adhesives are preferred.

A. SYNTHESIS OF CARRYING OUT THE INVENTION

The following Examples further illustrate the present invention, but are not to be construed to limit the scope of the present invention.

A. SYNTHESIS OF SQUARYLIUM COMPOUNDS

EXAMPLE 1

8.95 g of 3,4-dimethoxy-3-cyclobutene-1,2-dione and 12.74 g of 1-phenyl-3-propylpyrazolin-5-one were dissolved in 150 ml of methanol. To this solution, 8.71 g of potassium carbonate was added, and then the mixture was stirred at 25° C. for 1 hour. After the reaction, the precipitate was collected by filtration. The obtained solid was added to a mixture of 3 g of potassium carbonate and 130 ml of water, followed by reacting at 50° C. for 5 hours. After the reaction was completed, 100 ml of 1 mola aqueous hydrochloric acid was added to the mixture, and then the insoluble material was collected by filtration. To the obtained solid were added 90 ml of n-butanol, 45 ml of toluene and 9.30 g of 5-chloro-1,3,3-trimethyl-2-methyleneindoline, and the mixture was treated at 110° C. for 5 hours. Then, 100 ml of methanol was added thereto, and followed by reacting at 80° C. for 1 hour. The precipitate was then collected by filtration. To the obtained solid were added 175 ml of ethyl acetate, 17.5 ml of acetic acid and 4.97 g of aluminium tris (ethylacetoacetate), followed by reacting at 50° C. for 2 hours. The insoluble material was collected by filtration to give 13.75 g of the compound 1.

Elemental analysis ($C_{84}H_{75}AlCl_3N_9O_9$): Calcd. (%): C, 67.81, H, 5.08, N, 8.47; Found (%): C, 67.71, H, 4.89, N, 8.46; $^1$H—NMR δ (CDCl$_3$) ppm: 0.96 (3H, t, J=7.3 Hz), 1.02 (3H, t, J=7.4 Hz), 1.04 (3H, t, J=7.3 Hz), 1.26–1.81 (24H, m), 2.81–3.12 (6H, m), 3.40 (3H, s), 3.44 (6H, m), 5.63 (2H, m), 5.70 (1I, s), 6.86–6.88 (3H, m), 7.02–7.26 (15H, m), 7.83–7.97 (6H, m); IR (KBr) cm$^{-1}$: 2958, 1753, 1633, 1081, 794.

EXAMPLE 2

In a manner similar to that in Example 1 except that 1-phenyl-3-isopropylpyrazolin-5-one was used instead of 1-phenyl-3-propylpyrazolin-5-one, 9.84 g of the compound 2 was obtained.

Elemental analysis ($C_{84}H_{75}AlCl_3N_9O_9$): Calcd. (%): C, 67.81, H, 5.08, N, 8.47; Found (%): C, 67.60, H, 4.97, N, 8.38; $^1$H—NMR δ (CDCl$_3$) ppm: 1.22–1.35 (18H, m), 1.37–1.62 (18H, m), 3.38 (3H, m), 3.66–3.89 (3H, m), 5.61 (2H, m), 5.68 (1H, s), 6.85–6.87 (3H, m), 7.00–7.52 (15H, m), 7.86–7.98 (6H, m); IR (KBr) cm$^{-1}$: 2966, 1764, 1570, 1085, 793.

EXAMPLE 3

In a manner similar to that in Example 1 except that 1-methyl-3-propylpyrazolin-5-one was used instead of 1-phenyl-3-propylpyrazolin-5-one, 3.44 g of the compound 3 was obtained.

Elemental analysis ($C_{69}H_{69}AlCl_3N_9O_9$): Calcd. (%): C, 63.67, H, 5.34, N, 9.68; Found (%): C, 63.81, H, 5.57, N, 9.46; IR (KBr) cm$^{-1}$: 2960, 1763, 1587, 1099, 798.

EXAMPLE 4

In a manner similar to that in Example 1 except that 1-phenyl-3-methylpyrazolin-5-one was used instead of 1-phenyl-3-propylpyrazolin-5-one, and 1,3,3-trimethyl-2-methyleneindoline was used instead of 5-chloro-1,3,3-trimethyl-2-methyleneindoline, 0.68 g of the compound 4 was obtained.

Elemental analysis ($C_{78}H_{66}AlN_9O_9$): Calcd. (%): C, 72.04, H, 5.12, N, 9.69; Found (%): C, 71.95, H, 5.11, N, 9.42; $^1$H—NMR δ (CDCl$_3$) ppm: 1.60 (18H, m), 2.42 (3H, s), 2.52 (3H, s), 2.64 (3H, s), 3.48 (6H, m), 3.58 (3H, m), 5.65 (2H, m), 5.74 (1H, s), 6.97–7.30 (21H, m), 7.82–8.01 (6H, m); IR (KBr) cm$^{-1}$: 2964, 1763, 1601, 1095, 798.

EXAMPLE 5

In a manner similar to that in Example 1 except that 3-methyl-1-phenyl pyrazolin-5-one was used instead of 1-phenyl-3-propylpyrazolin-5-one, 0.99 g of the compound 5 was obtained.

Elemental analysis ($C_{78}H_{63}AlCl_3N_9O_9$): Calcd. (%): C, 66.74, H, 4.52, N, 9.98; Found (%): C, 65.61, H, 4.59, N, 9.74; $^1$H—NMR δ (CDCl$_3$) ppm: 1.64 (18H, m), 2.44 (3H, s), 2.54 (3H, s), 2.62 (3H, s), 3.42 (6H, m), 3.46 (31 m), 5.60 (2H, m), 5.69(11, s), 6.87–6.89 (3H, m), 7.00–7.34 (15H, m), 7.80–7.97 (6H, m); IR (KBr) cm$^{-1}$: 2966, 1763, 1600, 1091, 793.

EXAMPLE 6

In a manner similar to that in Example 1 except that 1-metyl-3-isopropylpyrazolin-5-one was used instead of 1-phenyl-3-propylpyrazolin-5-one, 0.70 g of the compound 6 was obtained.

Elemental analysis ($C_{69}H_{69}AlC_3N_9O9$): Calcd. (%): C, 63.67, H, 5.34, N, 9.56; Found (%): C, 63.67, H, 5.55, N, 9.68; $^1$H—NMR δ (CDCl$_3$) ppm: 1.24–1.31 (18H, m), 1.57–1.88 (18F, m), 3.13 (9H, m), 3.45 (3H, m), 3.74–3.81 (31, m), 5.71 (21, m), 6.85–6.87 (31I, m), 7.17–7.27 (6H, m); IR (KBr) cm$^{-1}$: 2966, 1763, 1610, 1166, 798.

EXAMPLE 7

In a manner similar to that in Example 1 except that 2.65 g of 5-bromo-1,3,3-trimethyl-2-methyleneindoline was used instead of 5-chloro-1,3,3-trimethyl-2-methyleneindoline, 4.23 g of the compound 7 was obtained.

Elemental analysis ($C_{84}H_{75}AlBr_3N_9O_9$): Calcd. (%): C, 62.23, H, 4.66, N, 7.78; Found (%): C, 62.34, H, 4.65, N, 7.80; $^1$H—NMR δ (CDCl$_3$) ppm: 0.94–1.07 (9H, m), 1.56–1.81 (24H, m), 2.81–3.12 (6H, m), 3.39–3.43 (9H, m), 5.63–5.70 (3H, m), 6.81–6.83 (3H, m), 7.01–7.24 (12H, m), 7.38–7.41 (3H, m), 7.82–7.96 (6H, m); IR (KBr) cm$^{-1}$: 2960, 1765, 1603, 1074, 1012.

EXAMPLE 8

In a manner similar to that in Example 1 except that 3.76 g of 3-methyl-1-(3-methylphenyl)pyrazolin-5-one was used instead of 1-phenyl-3-propylpyrazolin-5-one, 5.60 g of the compound 8 was obtained.

Elemental analysis ($C_{81}H_{69}AlCl_3N_9O_9$): Calcd. (%): C, 65.69, H, 4.81, N, 8.62; Found (%): C, 65.97, H, 4.71, N, 8.35; IR (KBr) cm$^{-1}$: 2927, 1763, 1635, 1082, 1009.

EXAMPLE 9

In a manner similar to that in Example 1 except that 3.76 g of 3-methyl-1-(4-methylphenyl)pyrazolin-5-one was used instead of 1-phenyl-3-propylpyrazolin-5-one, 5.97 g of the compound 9 was obtained.

Elemental analysis ($C_{81}H_{69}AlCl_3N_9O_9$): Calcd. (%): C, 67.56, H, 4.81, N, 8.72; Found (%): C, 67.29, H, 4.71, N, 8.50; IR (KBr) cm$^{-1}$: 2926, 1763, 1635, 1084, 939.

EXAMPLE 10

In a manner similar to that in Example 1 except that 5.41 g of 1-(3-methylphenyl)-3-propylpyrazolin-5-one was used instead of 1-phenyl-3-propylpyrazolin-5-one, and 3.59 g of 1,3,3-trimethyl-2-methyleneindoline was used instead of 5-chloro-1,3,3-trimethyl-2-methyleneindoline, 5.09 g of the compound 10 was obtained.

Elemental analysis ($C_{87}H_{84}AlN_9O_9$): Calcd. (%): C, 73.24, H, 5.93, N, 8.84; Found (%): C, 73.18, H, 5.78, N, 8.78; $^1$H—NMR δ (CDCl$_3$) ppm: 0.94–1.04 (9H, m), 1.53–1.78 (24H, m), 2.12–2.24 (9H, m), 2.75–3.11 (6H, m), 3.46 (9H, m), 5.65–5.75 (3H, m), 6.84–6.86 (3H, m), 6.93–7.05 (9H, m), 7.11–7.15 (31, m), 7.25–7.31 (3H, m), 7.60–7.85 (6H, m); IR (KBr) cm$^{-1}$: 2960, 1763, 1635, 1072, 939.

EXAMPLE 11

In a manner similar to that in Example 1 except that 1.94 g of 1-(3-methylphenyl)-3-propylpyrazolin-5-one was used instead of 1-phenyl-3-propylpyrazolin-5-one, 2.89 g of the compound 11 was obtained.

Elemental analysis ($C_{87}H_{81}AlCl_3N_9O_9$): Calcd. (%): C, 68.30, H, 5.93, N, 8.24; Found (%): C, 68.24, H.L 5.63, N, 8.44; $^1$H—NMR δ (CDCl$_3$) ppm: 0.94–1.07 (9H, m), 1.39–1.81 (24H, m), 2.14–2.25 (9H, m), 2.77–3.11 (6H, m), 3.42–3.45 (9H, m), 5.60–5.70 (3H, m), 6.84–6.88 (6H, m), 6.99–7.07 (6H, m), 7.23–7.27 (3H, m), 7.59–7.81 (6H, m); IR (KBr) cm$^{-1}$: 2960, 1763, 1637, 1072, 941.

EXAMPLE 12

In a manner similar to that in Example 1 except that 5.41 g of 1-(4-methylphenyl)-3-propylpyrazolin-5-one was used instead of 1-phenyl-3-propylpyrazolin-5-one, 4.75 g of the compound 12 was obtained.

Elemental analysis ($C_{87}H_{81}AlCl_3N_9O_9$): Calcd. (%): C, 68.30, H, 5.34, N, 8.24; Found (%): C, 68.50, H, 5.50, N, 8.44; $^1$H—NMR δ (CDCl$_3$) ppm: 0.94–1.06 (9H, m), 1.42–1.78 (24H, m), 2.21 (9H, s), 2.81–3.11 (6H, m), 3.38–3.44 (9H, m), 5.62–5.69 (3H, m), 6.85–7.02 (12H, m), 7.23–7.26 (3H, m), 7.66–7.81 (6H, m); IR (KBr) cm$^{-1}$: 2960, 1763, 1635, 1074, 937.

EXAMPLE 13

In a manner similar to that in Example 1 except that 1.40 g of 1,3,3-trimethyl-2-methylene-4,5-benzindoline was used instead of 5-chloro-1,3,3-trimethyl-2-methyleneindoline, 2.61 g of the compound 13 was obtained.

Elemental analysis ($C_{96}H_{84}AlN_9O_9$): Calcd. (%): C, 75.13, H, 5.52, N, 8.21; Found (%): C, 75.37, H, 5.43, N, 7.98; $^1$H—NMR δ (CDCl$_3$) ppm: 0.92–1.04 (9H, m), 1.53–1.95 (24H, m), 2.80–3.30 (6H, m), 3.59–3.66 (9H, m), 5.78–5.92 (3H, m), 6.96–7.29 (12H, m), 7.37–8.24 (21H, m); IR (KBr) cm$^{-1}$: 2960, 1763, 1632, 1074.

EXAMPLE 14

In a manner similar to that in Example 1 except that 5.84 g of 1-(4-bromophenyl)-3-propylpyrazolin-5-one was used instead of 1-phenyl-3-propylpyrazolin-5-one, 7.33 g of the compound 14 was obtained.

Elemental analysis ($C_{84}H_{72}AlBr_3Cl_3N_9O_9$): Calcd. (%): C, 58.50, H, 4.21, N, 7.31; Found (%): C, 58.37, H, 4.30, N, 7.07; $^1$H—NMR δ (CDCl$_3$) ppm: 0.98–1.03 (9H, m), 1.60–1.77 (24H, m), 2.83–3.09 (6H, m), 3.47 (9H, br s), 5.66–5.71 (3H, m), 6.88–6.93 (3H, m), 7.14–7.20 (3H, m), 7.27–7.29 (9H, m), 7.78–7.83 (6H, m); IR (KBr) cm$^{-1}$: 2929, 1765, 1070.

EXAMPLE 15

In a manner similar to that in Example 1 except that 5.84 g of 1-(4-bromophenyl)-3-propylpyrazolin-5-one was used instead of 1-phenyl-3-propylpyrazolin-5-one, and 4.18 g of 1,3,3-trimethyl-2-methylene-4,5-bonzindoline was used instead of 5-chloro-1,3,3-trimethyl-2-methyleneindoline, 5.48 g of the compound 15 was obtained.

Elemental analysis ($C_{96}H_{81}AlBr_3N_9O_9$): Calcd. (%): C, 65.09, H, 4.61, N, 7.12; Found (%): C, 64.95, H, 4.68, N, 6.89; $^1$H—NMR δ (CDCl$_3$) ppm: 0.96–1.07 (9H, m), 1.48–1.93 (24H, m), 2.87–3.03 (6H, m), 3.61–3.72 (9H, m), 5.90–5.97 (3H, m), 7.15–7.29 (9H, m), 7.31–7.47 (6H, m), 7.58–7.68 (3H, m), 7.81–8.05 (12H, m); IR (KBr) cm$^{-1}$: 2929, 1763.

EXAMPLE 16

In a manner similar to that in Example 1 except that 9.47 g of 1-(4-chlorophenyl)-3-methlpyrazolin-5-one was used instead of 1-phenyl-3-propylpyrazolin-5-one, and 4.60 g of 1,3,3-trimethyl-2-methylene-4,5-benzindoline was used instead of 5-chloro-1,3,3-trimethyl-2-methyleneindoline, 8.14 g of the compound 16 was obtained.

Elemental analysis ($C_{96}H_{81}AlCl_3N_9O_9$): Calcd. (%): C, 70.39, H, 4.98, N, 7.70; Found (%): C, 69.99, H, 5.04, N, 7.48; $^1$H—NMR δ (CDCl$_3$) ppm: 0.96–1.07 (9H, m), 1.51–1.94 (24H, m), 2.86–3.23 (6H, m), 3.71–3.71 (9H, m), 5.88–5.97 (3H, m), 7.00–7.14 (6H, m), 7.20–7.33 (3H, m), 7.40–8.12 (21H, m); IR (KBr) cm$^{-1}$: 2931, 1763, 947.

EXAMPLE 17

In a manner similar to that in Example 1 except that 15.36 g of 1,3-diphenylpyrazolin-5-one was used instead of 1-phenyl-3-propylpyrazolin-5-one, 14.22 g of the compound 17 was obtained. $^1$H—NMR δ (CDCl$_3$) ppm: 1.57 (18H, br s), 3.40 (9H, br s), 5.70 (3H, m), 6.80–6.87 (3H, m), 7.00–7.52 (27H, m), 7.65–7.80 (3H, m), 7.99–8.10 (6H, m).

EXAMPLE 18

In a manner similar to that in Example 1 except that 13.31 g of 3-(4-methoxyphenyl)-3-phenylpyrazolin-5-one was used instead of 1-phenyl-3-propylpyrazolin-5-one, 7.30 g of the compound 18 was obtained. $^1$H—NMR δ (CDCl$_3$) ppm: 1.58 (18H, br s), 3.39–3.68 (18H, m), 5.68 (3H, m), 6.57–6.86; (9H, m), 7.14–7.27 (9H, m), 7.34–7.45 (6H, m), 7.52–7.70 (6H, m), 7.87–7.90 (6H, m).

EXAMPLE 19

In a manner similar to that in Example 1 except that 9.47 g of 1-(4-chlorophenyl)-3-propylpyrazolin-5-one was used instead of 1-phenyl-3-propylpyrazolin-5-one, 7.72 g of the compound 19 was obtained.

Elemental analysis ($C_{84}H_{72}AlCl_6N_9O_9$): Calcd. (%): C, 63.40, H, 4.56, N, 7.92; Found (%): C, 63.73, H, 4.77, N, 7.77; $^1$H—NMR δ (CDCl$_3$) ppm: 0.96–1.06 (9H, m), 1.60–1.78 (24H, m), 2.81–3.10 (6H, m), 3.47 (9H, br s), 5.65–5.72 (3H, m), 6.88–6.92 (3H, m), 7.04–7.06 (3H, m), 7.12–7.17 (6, m), 7.26–7.29 (3H, m), 7.82–7.90 (6H, m); IR (KBr) cm$^{-1}$: 2962, 1763, 1570, 1074.

EXAMPLE 20

In a manner similar to that in Example 1 except that 9.47 g of 1-(3-chlorophenyl)-3-propylpyrazolin-5-one was used instead of 1-phenyl-3-propylpyrazolin-5-one, 7.72 g of the compound 20 was obtained.

Elemental analysis ($C_{84}H_{72}AlCl_6N_9O_9$): Calcd. (%): C, 63.40, H, 4.56, N, 7.92; Found (%): C, 63.73, H, 4.62, N, 7.82; $^1$H—NMR δ (CDCl$_3$) ppm: 0.95–1.05 (9H, m), 1.55–1.78 (24H, m), 2.73–3.07 (6H, m), 3.48–3.62 (9H, m), 5.64–5.73 (3H, m), 6.89–6.91 (3H, m), 7.00–7.19 (9H, m), 7.26–7.28 (3H, m), 7.76–8.10 (6H, m); IR (KBr) cm$^{-1}$: 2962, 1763, 1599, 1074.

EXAMPLE 21

In a manner similar to that in Example 1 except that 9.12 g of 1-phenyl-3-trifluoromethylpyrazolin-5-one was used instead of 1-phenyl-3-propylpyrazolin-5-one, and 2.01 g of 1,3,3-trimethyl-2-methylene-4,5-benzindoline was used instead of 5-chloro-1,3,3-trimethyl-2-methyleneindoline, 3.87 g of the compound 21 was obtained.

Elemental analysis ($C_{90}H_{63}AlF_9N_9O_9$): Calcd. (%): C, 67.04, H, 3.94, N, 7.82; Found (%): C, 67.09, H, 3.98, N, 7.79; $^1$H—NMR δ (CDCl$_3$) ppm: 1.63–2.14 (18H, m), 3.66–3.77 (9H, m), 5.56–6.15 (3H, m), 6.93–7.31 (12H, m), 7.36–7.73 (9H, m), 7.80–8.39 (12H, m); IR (KBr) cm$^{-1}$: 2936, 1772, 991.

EXAMPLE 22

In a manner similar to that in Example 1 except that 5.29 g of 1-(3-chlorophenyl)-3-propylpyrazolin-5-one was used instead of 1-phenyl-3-propylpyrazolin-5-one, and 4.02 g of 1,3,3-trimethyl-2-methylene-4,5-benzindoline was used instead of 5-chloro-1,3,3-trimethyl-2-methyleneindoline, 7.56 g of the compound 22 was obtained.

Elemental analysis ($C_{96}H_{81}AlCl_3N_9O_9$): Calcd. (%): C, 70.39, H, 4.98, N, 7.70; Found (%): C, 70.11, H, 5.03, N, 7.55; $^1$H—NMR δ (CDCl$_3$) ppm: 0.94–1.05 (9H, m), 1.47–2.00 (24H, m), 2.78–3.36 (6H, m), 3.60–3.66 (9H, m), 5.82–5.94 (3H, m), 6.96–7.12 (6H, m), 7.18–7.31 (3H, m), 7.39–7.67 (6H, m), 7.79–8.40 (15H, m); IR (KBr) cm$^{-1}$: 2929, 1763, 945.

EXAMPLE 23

In a manner similar to that in Example 1 except that 5.28 g of 1-(3-fluorophenyl)-3-propylpyrazolin-5-one was used instead of 1-phenyl-3-propylpyrazolin-5-one, and 4.62 g of 1,3,3-trimethyl-2-methylene-4,5-benzindoline was used instead of 5-chloro-1,3,3-trimethyl-2-methyleneindoline, 8.94 g of the compound 23 was obtained.

Elemental analysis ($C_{96}H_{81}AlF_3N_9O_9$): Calcd. (%): C, 72.58, H, 5.14, N, 7.93; Found (%): C, 72.30, H, 5.32, N, 7.65; $^1$H—NMR δ (CDCl$_3$) ppm: 0.94–1.06 (9H m), 1.56–1.92 (24H, m), 2.86–3.26 (6H, m) 3.60 –3.69 (9H, m), 5.84–5.95 (3H, m), 6.72–6.89 (6H, m), 7.20–7.33 (3H, m), 7.42–7.71 (9H, m), 7.79–8.13 (12H, m); IR (KBr) cm$^{-1}$: 2931, 1734, 949.

EXAMPLE 24

In a manner similar to that in Example 1 except that 5.28 g of 1-(4-fluorophenyl)-3-propylpyrazolin-5-one was used instead of 1-phenyl-3-propylpyrazolin-5-one, 11.35 g of the compound 24 was obtained.

Elemental analysis ($C_{84}H_{72}AlF_3Cl_3N_9O_9$): Calcd. (%): C, 65.43, H, 4.71, N, 8.18; Found (%): C, 65.28, H, 4.62, N, 8.00; $^1$H—NMR δ (CDCl$_3$) ppm: 0.96–1.06 (9H, m), 1.60–1.80 (24H, m), 2.82–3.11 (6H, m) 3.47 (9H, br s), 5.64–5.72 (3H, m), 6.75–6.92 (9H, m), 7.07–7.17 (3H, m), 7.25–7.28 (3H, m), 7.80–7.92 (6H, m); IR (KBr) cm$^{-1}$: 2962, 1765, 1579, 1074.

EXAMPLE 25

In a manner similar to that in Example 1 except that 2.16 g of 3-propyl-1-(4-trifluoromethylphenyl)pyrazolin-5-one was used instead of 1-phenyl-3-propylpyrazolin-5-one, 4.44 g of the compound 25 was obtained.

Elemental analysis ($C_{87}H_{72}AlCl_3F_9N_9O_9$): Calcd. (%): C, 61.76, H, 4.29, N, 7.45; Found (%): C, 61.51, H, 4.42, N, 7.20; $^1$H—NMR δ (CDCl$_3$) ppm: 0.92–1.03 (9H, m), 1.58–1.74 (24H, m), 2.87–3.08 (6H, m), 3.45–3.49 (9H, m), 5.69(3H, m), 6.90–6.95 (31, m), 7.20–7.47 (12H, m), 8.08 (6H, m); IR (KBr) cm$^{-1}$: 2962, 1765, 1551, 1065.

EXAMPLE 26

In a manner similar to that in Example 1 except that 8.35 g of 1-(4-chlorophenyl)-3-methylpyrazolin-5-one was used instead of 1-phenyl-3-propylpyrazolin-5-one, and 6.64 g of 1,3,3-trimethyl-2-methylene-4,5-benzindoline was used instead of 5-chloro-1,3,3-trimethyl-2-methyleneindoline, 9.51 g of the compound 26 was obtained.

Elemental analysis ($C_{87}H_{72}AlCl_3F_9N_9O_9$): Calcd. (%): C, 69.56, H, 4.48, N, 8.11; Found (%): C, 69.65, R 4.40, N, 8.27; $^1$H—NMR δ (CDCl$_3$) ppm: 1.48–1.82 (18H, m), 2.49–2.71 (9H, m), 3.60–3.69 (9H, m), 562–5.91 (3H, m), 7.00–7.48 (18H, m), 7.58–8.08 (12H, m); IR (KBr) cm$^{-1}$: 2929, 1732, 945.

EXAMPLE 27

In a manner similar to that in Example 1 except that 11.53 g of 1-(4-fluorophenyl)-3-methylpyrazolin-5-one was used instead of 1-phenyl-3-propylpyrazolin-5-one, and 7.08 g of 1,3,3-trimethyl-2-methylene-4,5-benzindoline was used instead of 5-chloro-1,3,3-trimethyl-2-methyleneindoline, 11.00 g of the compound 27 was obtained.

Elemental analysis ($C_{90H69}AlCl_3F_3N_9O_9$): Calcd. (%): C, 71.85, H, 4.62, N, 8.38; Found (%): C, 71.92, H, 4.94, N, 8.10; $^1$H—NMR δ (CDCl$_3$) ppm: 1.65–1.92 (18H, m), 2.50–2.78 (9H, m), 3.62–3.70 (9H, m), 5.84–5.94 (3H, m), 6.75–6.91 (6H, m), 7.23–7.33 (3H, m), 7.40–7.67 (6H, m), 7.82–8.10 (15H, m); IR (KBr) cm$^{-1}$: 2929, 1736, 945.

EXAMPLE 28

In a manner similar to that in Example 1 except that 2.16 g of 3-propyl-1-(4-trifluoromethylphenyl)pyrazolin-5-one was used instead of 1-phenyl-3-propylpyrazolin-5-one, and 1.29 g of 1,3,3-trimethyl-2-methylene-4,5-benzindoline was used instead of 5-chloro-1,3,3-trimethyl-2-methyleneindoline, 1.22 g of the compound 28 was obtained.

Elemental analysis ($C_{99}H_{81}AlF_9N_9O_9$): Calcd. (%): C, 68.39, H, 4.70, N, 7.25; Found (%): C, 68.68, H, 4.89, N, 7.05; $^1$H—NMR δ (CDCl$_3$) ppm: 0.95–1.08 (9H, m), 1.44–1.93 (24H, m), 2.89–3.30 (6H, m), 3.63–3.72 (9H, m), 5.88–6.00 (3H, m), 7.20–7.52 (15H, m), 7.61–8.30 (15H, m); IR (KBr) cm$^{-1}$: 2931, 1765, 947.

EXAMPLE 29

In a manner similar to that in Example 1 except that 1.02 g of 5-methoxy-1,3,3-trimethyl-2-methyleneindoline was used instead of 5-chloro-1,3,3-trimethyl-2-methyleneindoline, 1.70 g of the compound 29 was obtained.

Elemental analysis ($C_{87}H_{84}AlN_9O_{12}$): Calcd. (%): C, 70.86, H, 5.74, N, 8.55; Found (%): C, 70.67, H, 5.89, N, 8.54; $^1$H—NMR δ (CDCl$_3$) ppm: 1.02 (9H, m), 1.24–1.76 (24H, m), 2.80–3.12 (6H, m), 3.44–3.48 (9H, m), 3.67 (9H, m), 5.65 (3H, m), 6.57–6.90 (9H, m), 6.98–7.01 (3H m), 7.10–7.18 (6H, m), 7.84–8.00 (6H, m); IR (KBr) cm$^{-1}$: 2958, 1763, 1016.

EXAMPLE 30

In a manner similar to that in Example 1 except that 18.25 g of 1-phenyl-3-trifluoromethylpyrazolin-5-one was used instead of 1-phenyl-3-propylpyrazolin-5-one, 4.04 g of the compound 30 was obtained. $^1$H—NMR δ (CDCl$_3$) ppm: 1.19–1.77 (18H, m), 3.47–3.61 (9H, m), 5.52–6.00 (3H, m), 6.84–7.43 (18H, m), 7.52–8.18 (6H, m).

EXAMPLE 31

In a manner similar to that in Example 1 except that 11.80 g of 1,3-dimethylpyrazolin-5-one was used instead of 1-phenyl-3-propylpyrazolin-5-one, and 18.25 g of 1,3,3-trimethyl-2-methylene-4,5-benzindoline was used instead of 5-chloro-1,3,3-trimethyl-2-methyleneindoline, 13.65 g of the compound 31 was obtained. $^1$H—NMR δ (CDCl$_3$) ppm: 1.78–1.98 (18H, m), 2.54–2.67 (9H, m), 3.33–3.41 (9H, m), 3.56–3.63 (9H, m), 5.80 (3l, m), 7.28 (3H, m), 7.44 (3l, m), 7.63 (3l, m), 7.84–7.96 (9H, m).

EXAMPLE 32

In a manner similar to that in Example 1 except that 1.72 g of 3,3-dimethyl-2-methyleneindoline was used instead of 5-chloro-1,3,3-trimethyl-2-methyleneindoline, 2.46 g of compound 32 was obtained.

Elemental analysis ($C_{81}H_{72}AlN_9O_9$): Calcd. (%): C, 72.47, FL 5.41, N, 9.39; Found (%): C, 72.77, F. 5.42, N, 9.26; $^1$H—NMR δ (CDCl$_3$) ppm: 0.88–1.11 (9H, m), 1.24–1.55 (18H, m), 1.57–1.83 (6H, m), 2,53–3.07 (6H, m), 5.21–5.65 (3l, m), 6.78–7.37 (21H, m), 7.57–8.04 (6H, m), 11.5–12.81 (3H, m); IR (KBr) cm$^{-1}$: 2962, 1770, 1013.

EXAMPLE 33

In a manner similar to that in Example 1 except that 18.25 g of 1-phenyl-3-trifluoromethylpyrazolin-5-one was used instead of 1-phenyl-3-propylpyrazolin-5-one, and 9.71 g of 5-methoxy-1,3,3-trimethyl-2-methyleneindoline was used instead of 5-chloro-1,3,3-trimethyl-2-methyleneindoline, 13.19 g of the compound 33 was obtained. $^1$H—NMR δ (CDCl$_3$) ppm: 1.24–1.79 (18H, m), 3.50–3.69 (9H, m), 3.75–3.88 (9H, m), 5.48–5.98 (3H, m), 6.49–7.29 (18H, m), 7.71–8.15 (6H, m).

EXAMPLE 34

In a manner similar to that in Example 1 except that 18.25 g of 1-phenyl-3-trifluoromethylpyrazolin-5-one was used instead of 1-phenyl-3-propylpyrazolin-5-one, and 9.20 g of 5-methyl-1,3,3,5-tetramethyl-2-methyleneindoline was used instead of 5-chloro-1,3,3-trimethyl-2-methyleneindoline, 11.79 g of the compound 34 was obtained. $^1$H—NMR δ (CDCl$_3$) ppm: 1.25–1.79 (18H, m), 2.18–2.45 (9H, m), 3.50–3.64 (9H, m), 5.53–6.01 (3H, m), 6.62–7.30 (18H, m), 7.69–8.11 (6H, m).

EXAMPLE 35

In a manner similar to that in Example 1 except that 18.25 g of 1-phenyl-3-trifluoromethylpyrazolin-5-one was used instead of 1-phenyl-3-propylpyrazolin-5-one, and 10.09 g of 1-methyl-2-methyleneindoline-3-spirocyclohexane was used instead of 5-chloro-1,3,3-trimethyl-2-methyleneindoline, 12.34 g of the compound 35 was obtained.

Elemental analysis ($C_{87}H_{69}AlF_9N_9O_9$): Calcd. (%): C, 66.03, H, 4.39, N, 7.97; Found (%): C, 65.81, H, 4.46, N, 7.87; $^1$H—NMR δ (CDCl$_3$) ppm: 1.35–1.59 (6H, m), 1.68–2.17 (24H, m), 3.84 (9H, m), 5.59–5.92 (3H, m), 7.09 (9H, m), 7.26–7.46 (9H, m), 7.85–8.00 (9H, m); IR (KBr) cm$^{-1}$: 2936, 1771, 987.

EXAMPLE 36

In a manner similar to that in Example 1 except that 0.56 g of 5,7-dichloro-1,3,3-trimethyl-2-methyleneindoline was used instead of 5-chloro-1,3,3-trimethyl-2-methyleneindoline, 0.70 g of the compound 36 was obtained.

Elemental analysis ($C_{84}H_{72}AlCl_6N_9O_9$): Calcd. (%): C, 63.40, H, 4.56, N, 7.92; Found (%): C, 63.18, H, 4.46, N, 7.82; $^1$H—NMR δ (CDCl$_3$) ppm: 0.94–1.08 (9H, m), 1.35–1.82 (24H, m), 2.81–3.13 (6H, m), 3.80 (9H, m), 5.64–5.72 (3H, m), 6.87–7.24 (15H, m), 7.79–7.95 (6H, m); IR (KBr) cm$^{-1}$: 2960, 1765, 1070.

B. CHARACTERIZATION OF SQUARYLIUM COMPOUNDS

EXAMPLE 37

The maximum absorption wavelengths ($λ_{max}$) and the molar extinction coefficients at the maximum absorption wavelength for the compounds obtained in Examples 1–36 were measured in a chloroform solution. Results are listed in Table 4.

EXAMPLE 38

The decomposition temperatures for the compounds obtained in Examples 1–36 were measured. Results are listed in Table 4.

COMPARATIVE EXAMPLE 1

Similarly, the maximum absorption wavelengths ($λ_{max}$), the molar extinction coefficients at the maximum absorption wavelength in a chloroform solution, and the on temperature were measured for the squarylium compounds which were for metal complexation in Examples 1–6 (Compounds $1_b$–$6_b$) (i.e., these had not been complexed with a metal). Results are listed in Table 5.

TABLE 4

Spectroscopic Properties and Decomposition Temperature of Squarylium Compounds

| Example Compound | Spectroscopic Properties (in Chloroform) | | Decomposition Temperature (° C.) |
|---|---|---|---|
| | $λ_{max}$ (nm) | log ε | |
| 1 | 572.5 | 5.4 | 315 |
| 2 | 572.5 | 5.4 | 330 |
| 3 | 586.5 | 5.4 | 325 |
| 4 | 568.5 | 5.4 | 327 |
| 5 | 572.0 | 5.4 | 312 |
| 6 | 587.5 | 5.4 | 334 |
| 7 | 573.0 | 5.4 | 317 |

TABLE 4-continued

Spectroscopic Properties and Decomposition Temperature of Squarylium Compounds

| Example Compound | Spectroscopic Properties (in Chloroform) $\lambda_{max}$ (nm) | log $\epsilon$ | Decomposition Temperature (°C.) |
|---|---|---|---|
| 8 | 570.5 | 5.4 | 316 |
| 9 | 569.5 | 5.4 | 331 |
| 10 | 570.0 | 5.4 | 328 |
| 11 | 573.0 | 5.4 | 318 |
| 12 | 572.0 | 5.4 | 315 |
| 13 | 589.5 | 5.4 | 327 |
| 14 | 573.0 | 5.4 | 313 |
| 15 | 561.0 | 5.4 | 285 |
| 16 | 590.5 | 5.4 | 300 |
| 17 | 577.5 | 5.4 | 286 |
| 18 | 577.0 | 5.4 | 292 |
| 19 | 573.0 | 5.4 | 311 |
| 20 | 574.0 | 5.4 | 310 |
| 21 | 589.5 | 5.4 | 301 |
| 22 | 591.0 | 5.4 | 302 |
| 23 | 589.5 | 5.4 | 301 |
| 24 | 572.5 | 5.4 | 311 |
| 25 | 573.5 | 5.4 | 296 |
| 26 | 585.5 | 5.4 | 319 |
| 27 | 589.0 | 5.4 | 324 |
| 28 | 591.5 | 5.4 | 277 |
| 29 | 582.0 | 5.4 | 301 |
| 30 | 572.5 | 5.4 | 290 |
| 31 | 583.0 | 5.2 | 297 |
| 32 | 582.5 | 5.3 | 315 |
| 33 | 583.0 | 5.3 | 300 |
| 34 | 572.5 | 5.4 | 304 |
| 35 | 580.0 | 5.3 | 286 |
| 36 | 573.0 | 5.4 | 310 |

TABLE 5

Spectroscopic Properties and Decomposition Temperature of Squarylium Compounds

| Comparative Example Compound | Spectroscopic Properties (in Chloroform) $\lambda_{max}$ (nm) | log $\epsilon$ | Decomposition Temperature (°C.) |
|---|---|---|---|
| $1_b$ | 577.5 | 5.1 | 280 |
| $2_b$ | 578.5 | 5.2 | 289 |
| $3_b$ | 570.0 | 5.2 | 270 |
| $4_b$ | 571.0 | 5.2 | 290 |
| $5_b$ | 576.5 | 5.3 | 300 |
| $6_b$ | 571.0 | 5.2 | 270 |

EXAMPLE 39

The optical constants for thin films of the compounds obtained in Examples 1–6 sured. Results are listed in Table 6.

COMPARATIVE EXAMPLE 2

Similarly, the optical constants for thin films of the squarylium compounds which were not treated for metal complexation in Examples 1–6 (Compounds $1_b$–$6_b$) were mesure. Results are listed in Table 7.

TABLE 6

Optical Constants for Squarylium Compounds

| Example Compound | $\lambda = 650$ nm n | k | $\lambda = 660$ nm n | k |
|---|---|---|---|---|
| 1 | 2.815 | 0.078 | 2.607 | 0.038 |
| 2 | 2.772 | 0.095 | 2.575 | 0.049 |
| 3 | 2.628 | 0.058 | 2.480 | 0.035 |
| 4 | 2.766 | 0.080 | 2.591 | 0.048 |
| 5 | 2.872 | 0.115 | 2.662 | 0.055 |
| 6 | 2.452 | 0.062 | 2.342 | 0.048 |

TABLE 7

Optical Constants for Squarylium Compounds

| Comparative Example Compound | $\lambda = 650$ nm n | k | $\lambda = 660$ nm n | k |
|---|---|---|---|---|
| $1_b$ | 2.634 | 0.135 | 2.482 | 0.086 |
| $2_b$ | 2.598 | 0.079 | 2.451 | 0.041 |
| $3_b$ | 2.482 | 0.084 | 2.367 | 0.059 |
| $4_b$ | 2.572 | 0.100 | 2.446 | 0.053 |
| $5_b$ | impossible to make a thin film due to crystal formation | | | |
| $6_b$ | 2.450 | 0.052 | 2.343 | 0.037 |

From Tables 6 and 7, it can be seen that metal complexation caused a larger rafractive index and an improved solubility in an organic solvent.

EXAMPLE 40

Thin films of the compounds obtained in Examples 1, 2, and 4 were irradiated with the light from a xenon lamp (50,000 luxes) to determine a photodeteriorating rate constant from the change in their optical densities in time course. Results are listed in Table 8. The photodeteriorating rate constants were calculated using the following equation:

$$d[OD]/dt = k[OD]$$

[OD]: Optical density for the thin film of the squarylium compound;

k: Photodeteriorating rate constant.

COMPARATIVE EXAMPLE 3

Similarly, photodeteriorating rate constants for thin films of the squarylium compounds which were not treated for metal complexation in Example 1,2 and 4 (Compounds $1_b$, $2_b$, and $4_b$) were determined. Results are listed in Table 8.

TABLE 8

Photodeteriorating Rate Constants for the Thin Film of the Squarylium Compounds

| Compound in Comparative Example/ Compound in Example | Ratio of the Photodeteriorating Rate Constants: $k_0/k$ $k_0$: non-metal complex k: metal complex |
|---|---|
| $1_b/1$ | 7.2 |
| $2_b/2$ | 6.5 |
| $4_b/4$ | 5.8 |

From Table 8, it can be seen that metal complexation caused improved light resistance.

C. CHARACTERIZATION OF OPTICAL RECORDING MEDIA USING A SQUARYLIUM COMPOUND

Examples relating to the optical recording media will be illustrated below.

EXAMPLE 41

A solution prepared by dissolving the compound 1 in 2,2,3,3-tetrafluoro-1-propanol was spinner-coated on an injection molded-polycarbonate substrate of 0.6 mm thickness having a guiding groove of the groove depth of 1,750 Å, the half band width of 0.38 μm, and the track pitch of 0.74 μm to form an organic dye layer having the thickness of 900 Å.

Then, a gold reflective layer having the thickness of 1,200 Å was provided thereon by a sputtering method, a protective layer having the thickness of 7 μm was further provided thereon with an acrylic photopolymer, and then an injection molded-polycarbonate flat substrate having the thickness of 0.6 mm was adhered thereto with an acrylic photopolymer to prepare an optical recording medium.

An EFM signal was recorded on the prepared optical recording medium with tracking (linear speed of 3.5 n/sec.) using the semiconductor laser beam having an oscillation wavelength of 658 nm and a beam diameter of 1.0 μm, and then the recorded signal was reproduced with a continuous beam of the semiconductor laser having an oscillation wavelength of 658 nm (reproduction power of 0.7 mW). The resulting signal properties are listed in Table 9.

EXAMPLES 42–46

The optical recording medium was formed according to the completely same way as that in Example 41 except that the compound 2, 4, 5 or 6 was used instead of the compound 1, and the signal properties thereof were measured. The resulting signal properties are listed in Table 9.

TABLE 9

Signal Properties of Recording Media

|  | Reflectance (%): grooved portion | Modulation Percentage (%): I14/I14H | Jitter (%) |
|---|---|---|---|
| Example 41 | 50 | 63.3 | 7.8 |
| Example 42 | 49 | 63.7 | 8.0 |
| Example 43 | 47 | 61.8 | 7.9 |
| Example 44 | 48 | 62.9 | 8.0 |
| Example 45 | 48 | 62.5 | 8.1 |
| Example 46 | 49 | 63.1 | 8.3 |

From Table 9, it can be seen that signal properties of the high reflectance, high modulation percentage and low jitter which are conformable to DVD-R standard were obtained according to the optical recording medium of the present invention.

EXAMPLE 47

An optical recording medium was formed using a mixture of the compound 1 and the metal complex No. 3 (see Table 2; weight ratio of compound 1/metal complex No. 3=10/3) instead of the compound 1.

The recording medium was irradiated with the light from a xenon lamp (50,000 luxes) for 10 hours, and a remaining ratio of an optical density was evaluated. The remaining ratio of an optical density was calculated by the following equation:

$$\text{Remaining ratio of an optical density}=I_d/I_o\times100(\%)$$

$I_d$: Optical density after irradiation;
$I_o$: Optical density before irradiation.

The results of the light resistance test are listed in Table 10.

EXAMPLE 48–50

An optical recording medium was formed in a manner similar to that in Example 47, using the aromatic amine compound No. 104 (see Table 3) instead of the metal complex No. 3 (Example 48), and further using a mixture of the compound 2 and the metal complex No. 12 (see Table 2) (Example 49) or a mixture of the compound 2 and the aromatic amine compound No. 113 (see Table 3) (Example 50) instead of a mixture of the compound 1 and the metal complex No. 3. A light resistance test was performed on the resulting optical recording medium in a manner similar to that in Example 47. The results of the light resistance test are listed in Table 10.

TABLE 10

Results of Light Resistance Test of Optical Recording Media

| | Compound No. | Light Stabilizer No. | Remaining Ratio of Optical Density (%) |
|---|---|---|---|
| Example 47 | 1 | 3 | 82 |
| Example 48 | 1 | 104 | 89 |
| Example 49 | 2 | 12 | 85 |
| Example 50 | 2 | 113 | 91 |

From Table 10, it can be seen that excellent light resistance was obtained according to the optical recording medium of the present invention.

INDUSTRIAL APPLICABILITY

According to the present invention, there can be provided squarylium compounds having spectroscopic and thermal decomposition properties suitable for an oscillation wavelength of a semiconductor laser used for a digital versatile disc-recordable (DVD-R). Also, DVD-R media having the excellent light resistance as well as the high reflectance and modulation depth can be provided by using the squarylium compound of the present invention as an optical recording material.

What is claimed is:

1. A squarylium compound in a state of a metal complex represented by the general formula (I):

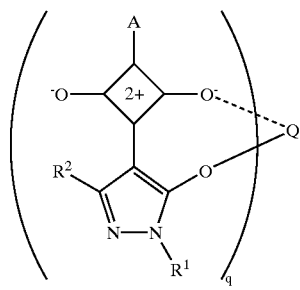

wherein, $R^1$ and $R^2$ are the same or different, and represent an alkyl group optionally having a substituent, an aralkyl group optionally having a substituent, an aryl group optionally having a substituent, or a heterocyclic group optionally having a substituent; Q represents a metal atom with a coordination ability; q represents 2 or 3; and A represents an aryl group optionally having a substituent, a heterocyclic group optionally having a substituent, or Y=CH— wherein Y represents an aryl group optionally having a substituent or a heterocyclic group optionally having a substituent.

2. The squarylium compound in a state of a metal complex according to claim 1, wherein Y=CH— is represented by the general formula (II):

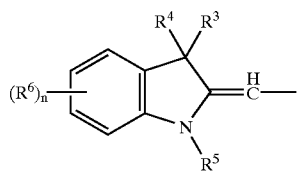

wherein $R^3$ and $R^4$ are the same or different, and represent an alkyl group optionally having a substituent, or $R^3$ and $R^4$ may be taken together with an adjacent carbon atom to form an alicyclic hydrocarbon ring or a heterocycle optionally having a substituent; $R^5$ represents a hydrogen atom, an alkyl group optionally having a substituent, an aralkyl group optionally having a substituent or an aryl group optionally having a substituent; $R^6$ represents a halogen atom, an alkyl group optionally having a substituent, an aralkyl group optionally having a substituent, an aryl group optionally having a substituent, a nitro group, a cyano group or an alkoxy group optionally having a substituent; and n represents an integer of 0–4, and when n is 2–4, then $R^6$s are the same or different, or two adjacent $R^6$s may be taken together with two adjacent carbon atoms to form an aromatic ring optionally having a substituent.

3. The squarylium compound in a state of a metal complex according to claim 1 or 2, wherein Q is a trivalent metal.

4. The squarylium compound in a state of a metal complex according to claim 3, wherein the trivalent metal is aluminium.

5. An optical recording medium having a recording layer comprising the squarylium compound in a state of a metal complex according to claim 1.

6. The optical recording medium according to claim 5, wherein the recording layer contains a light stabilizer.

7. The optical recording medium according to claim 6, wherein the light stabilizer is a compound selected from the group consisting of a metal complex and an aromatic amine.

8. The optical recording medium according to claim 7, wherein the light stabilizer is contained at 5–40% by weight relative to the squarylium compound.

9. The optical recording medium according to claim 5, wherein a single layer of the recording layer of a recordable optical recording medium has the refractive index (n) of $1.5 \leq n \leq 3.0$ and the extinction coefficient (k) of $0.02 \leq k \leq 0.3$ for the light of a wavelength range of a recording or reproducing wavelength ±5 nm.

10. The optical recording medium according to claim 5, which has a track pitch on a substrate within the range of 0.7–0.8 μm and a groove width at the half band width within the range of 0.18–0.40 μm.

11. The optical recording medium according to claim 5, which has a recording or reproducing wavelength within the range of 600–700 nm.

12. The optical recording medium according to claim 5, which has a maximum absorption wavelength within the range of 550–600 nm in a chloroform solution and log ϵ (ϵ is a molar extinction coefficient) at said maximum absorption wavelength of 5 or larger.

* * * * *

UNITED STATES PATENT AND TRADEMARK OFFICE
CERTIFICATE OF CORRECTION

PATENT NO.   : 6,660,867 B2
DATED        : December 9, 2003
INVENTOR(S)  : Ikuo Shimizu et al.

It is certified that error appears in the above-identified patent and that said Letters Patent is hereby corrected as shown below:

Column 4
Line 52, "1 to" should read -- 1 to 5 --.

Column 5
Line 6, "vanadium (II)" should read -- vanadium (III) --.

Column 16
Line 34, "$R_e$" should read -- $R_c$ --.
Line 57, "$R_b$" should read -- $R_d$ --.

Column 19
Line 58, "tability" should read -- stability --.

Column 21
Line 19, delete "mola" and insert therein -- mol/1 --.
Line 38, delete "(11s)" and insert therein -- (Hs) --.

Column 22
Line 21, delete "(31 m) and insert therein -- (3H, m) --.
Line 22, delete "(11, s)" and insert therein -- (1H, s) --.
Line 34, delete "(18F, m)" and insert therein -- (18H, m) --.
Line 35, delete "(31, m)" and insert therein -- (3H, m) --; delete "(21, m)" and insert therein -- (2H, m) --; and delete "(311, m)" and insert therein -- (3H, m) --.

Column 23
Line 14, delete "(31, m)" and insert therein -- (3H, m) --.
Line 24, delete "H.L. 5.63" and insert therein -- H, 5.63 --.

Column 24
Line 30, delete "3.71-3.73" and insert therein -- 3.61-3.71 --.
Line 62, delete "(6, m)" and insert therein -- (6H, m) --.

Column 26
Line 14, delete "(31, m)" and insert therein -- (3H, m) --.
Line 24, after "Elemental analysis" delete "$(C_{87}H_{72}AlCl_3F_9N_9O_9)$" and insert therein -- $(C_{90}H_{69}AlCl_3N_9O_9)$ --.
Line 25, delete "R4.40" and insert therein -- H4.40 --.
Line 27, delete "562-5.91" and insert therein -- 5.62-5.91 --.

UNITED STATES PATENT AND TRADEMARK OFFICE
CERTIFICATE OF CORRECTION

PATENT NO. : 6,660,867 B2
DATED : December 9, 2003
INVENTOR(S) : Ikuo Shimizu et al.

It is certified that error appears in the above-identified patent and that said Letters Patent is hereby corrected as shown below:

Column 27
Lines 26 and 27, delete all occurrences of "(31, m)" and insert therein -- (3H, m) --.
Line 37, delete "2,53" and insert therein -- 2.53 --.
Line 38, delete "(31, m)" and insert therein -- (3H, m) --.

Column 28
Line 46, delete "the on" and insert therein -- the decomposition --.
Lines 47 to 48, after "which were" at the end of line 47 and before "for" at the beginning of line 48, insert therein -- not treated --.

Column 29
Line 57, delete "sured" and insert therein -- were measured --.
Line 67, delete "mesure" and insert therein -- measured --.

Column 31
Line 27, delete "n/sec." and insert therein -- m/sec. --.

Signed and Sealed this

Twenty-first Day of June, 2005

JON W. DUDAS
*Director of the United States Patent and Trademark Office*